(12) United States Patent
Schwass

(10) Patent No.: US 7,712,632 B2
(45) Date of Patent: May 11, 2010

(54) MATERIAL DISCHARGE APPARATUS AND METHOD

(75) Inventor: Trevor Douglas Anthony Schwass, Napier (NZ)

(73) Assignee: DSH Systems Limited, Napier (NZ)

( * ) Notice: Subject to any disclaimer, the term of this patent is extended or adjusted under 35 U.S.C. 154(b) by 854 days.

(21) Appl. No.: 10/581,730

(22) PCT Filed: Dec. 23, 2004

(86) PCT No.: PCT/NZ2004/000337

§ 371 (c)(1),
(2), (4) Date: Jun. 6, 2006

(87) PCT Pub. No.: WO2005/061347

PCT Pub. Date: Jul. 7, 2005

(65) Prior Publication Data

US 2007/0114240 A1    May 24, 2007

(30) Foreign Application Priority Data

Dec. 23, 2003  (NZ) ..................................... 530388

(51) Int. Cl.
*B67D 1/00* (2006.01)
(52) U.S. Cl. ........................... 222/58; 222/65; 222/162; 222/181.2; 222/185.1; 222/461; 222/503; 222/559
(58) Field of Classification Search ................... 222/58, 222/65, 162, 181.2, 185.1, 503–504, 559, 222/160, 181.1, 460–461
See application file for complete search history.

(56) References Cited

U.S. PATENT DOCUMENTS

| 2,788,809 | A | * | 4/1957 | Paton | .................. 141/353 |
| 3,853,247 | A | * | 12/1974 | Wahl | .................. 222/199 |
| 4,410,111 | A | * | 10/1983 | Barger | .................. 222/509 |
| 5,992,689 | A | | 11/1999 | Johanson | |

FOREIGN PATENT DOCUMENTS

| DE | 29 23 672 A1 | 12/1980 |
| EP | 389919 B1 | 8/1993 |
| EP | 498474 B1 | 3/1995 |
| EP | 1038802 | 8/2002 |
| GB | 2256427 A | 12/1992 |

(Continued)

*Primary Examiner*—Kevin P Shaver
*Assistant Examiner*—Andrew P Bainbridge
(74) *Attorney, Agent, or Firm*—Bio Intellectual Property Service LLC; O. M. (Sam) Zaghmout

(57) ABSTRACT

This invention is a material discharge apparatus for controlling the flow rate of flowable material being conveyed through a hopper, the apparatus includes a hopper with an inlet at the top to receive flowable material and a discharge outlet at the base of the hopper, a valve configured and arranged in the hopper, the valve has a lower end portion adjacent the discharge outlet forming a gap between the hopper and the valve for material discharge, with the valve fixedly connected to a fixed support beam, the hopper elastically connected to the same fixed support beam such that as the more material is received by the inlet, the more the hopper sags, the larger the gap formed between the valve and the hopper grows, thereby increasing the rate of flow of material discharge.

7 Claims, 5 Drawing Sheets

FOREIGN PATENT DOCUMENTS

| | | |
|---|---|---|
| JP | 01/070390 A | 3/1989 |
| JP | 11100091 A | 4/1999 |
| JP | 2003231587 A | 8/2003 |
| SU | 874497 | 10/1981 |
| SU | 1271-789 A | 11/1986 |
| SU | 1668257 A1 | 8/1991 |
| WO | WO 92/14126 A | 8/1992 |

* cited by examiner

MATERIAL DISCHARGE APPARATUS AND METHOD

TECHNICAL FIELD

This invention relates to material discharge hoppers and material conveyor systems. More particularly, but not exclusively, the present invention relates to a material discharge apparatus and a method for controlling the discharge flow rate of material from a hopper.

BACKGROUND ART

Many conventional hoppers discharge granular or particulate material directly through a funnel shaped discharge opening by gravity feeding the material through the hopper. However, one problem with such conventional hoppers is the amount of dust dispersed into the surrounding environment. This can result in some of the material being wasted during the conveying process. Further, the amount of dust, particularly fine dust, being discharged into the surrounding air is undesirable and can damage machinery. Further, such dust can pose a health hazard for persons exposed to the dust.

It is a non-limiting object of the invention to provide a material discharge apparatus and method of operation thereof that overcomes at least some of the abovementioned problems, or at least to provide the public with a useful choice.

SUMMARY OF THE INVENTION

According to a first broad aspect of the invention there is provided a material discharge apparatus for controlling the flow rate of flowable material being conveyed through a hopper, the apparatus including a hopper having an inlet opening at the top and a discharge outlet at the base of the hopper, and a valve means configured and arranged in the hopper, the valve means having a lower end portion adjacent the discharge outlet forming a gap between the hopper and the valve means for material to flow therethrough, the valve means and/or the hopper being adapted to move relative to the other, in use, for controlling the rate of discharge of material through the gap.

Preferably the valve means is arranged in the hopper such that the lower end portion adjacent the discharge outlet is substantially centrally positioned such that the gap between the hopper and the valve means is evenly spaced about the lower end portion of the valve means.

Desirably the hopper is adapted to be suspended below a support frame by hopper support members, and wherein the valve means is adapted to be suspended below the support frame.

Desirably the hopper is adapted to be suspended below a support frame by a plurality of spaced apart hopper support members, the hopper support members being elastic in form, in use, to expand under the weight of material being conveyed through the hopper so as to slightly increase the gap between the hopper and the valve means to increase the flow of material therethrough.

Preferably the valve means includes a bulbous lower end portion having a circular cross section, and wherein the hopper has a circular cross section that is tapered toward the discharge outlet.

Alternatively the hopper is adapted to be attached to a support frame and being adapted with a load cell transducer means configured and arranged to measure the weight of the hopper and generate a measurement signal that is forwarded to a valve control means, and a valve height adjustment means configured and arranged for attachment to the valve means and being electrically connected to the valve control means and to receive command signals therefrom, the valve control means being adapted to receive, in use, a measurement signal from the transducer means and control movement of the valve means by the valve control means to raise and lower the valve means to increase or decrease the gap respectively between the hopper and the valve means.

Preferably the valve control means includes a computer controller means programmed by a suitable computer program for controlling the operation of the valve height adjustment means, the controller means allowing a user to enter a preset weight setting for the hopper, and in use, the controller means receives a digital measurement signal from the load cell means representing the weight of the hopper with material, and when the weight signal exceeds the threshold preset weight setting the controller means actuates the valve height adjustment means to raise the valve means to increase the gap and allow a higher discharge rate of material until the weight measurement signal from the load cell means falls below the preset weight setting.

Desirably the controller means actuates the valve height adjustment means to raise the valve means in predetermined incremental lift positions.

Preferably the hopper is made of a rotary moulded plastics material.

Preferably the hopper support members include coil springs, in use, that are expandable under the weight of lading in the hopper.

According to a second broad aspect of the invention there is provided a computer controlled process for controlling the flow rate of material conveyed through a hopper, the computer program including the steps of:

a.) receiving a measurement signal from a load cell transducer means representing an actual measurement of weight of a hopper with material flowing therethrough and comparing the measurement against a preset measurement of weight representing a preferred flow rate through the hopper;

b.) if the actual measurement of weight is more than the preset measurement of weight a control signal is sent to a valve height adjustment means to lift a valve means in the hopper to increase the discharge rate of material flowing through the hopper;

c.) if the actual measurement of weight is less than the preset measurement of weight a control signal is sent to the valve height adjustment means to lower the valve means in the hopper to decrease the discharge rate of material flowing through the hopper; and d.) resetting the program to repeat step a until the material has been discharged through the hopper.

Preferably in step a.) the program allows an operator to preset the number of measurements per minute taken by the load cell transducer means.

Preferably in step a.) if the actual measurement of weight is determined by the program to be the same as the preset measurement of weight the program will reset to step a.

Desirably the invention includes a computer controlled process using the material discharge apparatus of the first aspect of the invention and preferably any of the preferred features of the invention.

According to a third broad aspect of the invention there is provided a method of controlling the flow rate of material conveyed through a hopper, the steps of the method including:

A.) Comparing an actual measurement of weight of a hopper with material flowing therethrough with a preset measurement of weight representing a preferred flow rate through the hopper;

B.) if the actual measurement of weight is more than the preset measurement of weight, the valve means in the hopper is actuated to rise to increase the discharge rate of material flowing through the hopper;

C.) if the actual measurement of weight is less than the preset measurement of weight the valve means in the hopper is actuated to lower the valve means in the hopper to decrease the discharge rate of material flowing through the hopper; and D.) repeating step a until the material has been discharged through the hopper.

BRIEF DESCRIPTION OF THE DRAWINGS

Preferred embodiments of the invention will now be illustrated, by way of example only, with reference to the accompanying drawings in which.

DETAILED DESCRIPTION OF THE DRAWINGS

Figure 1:
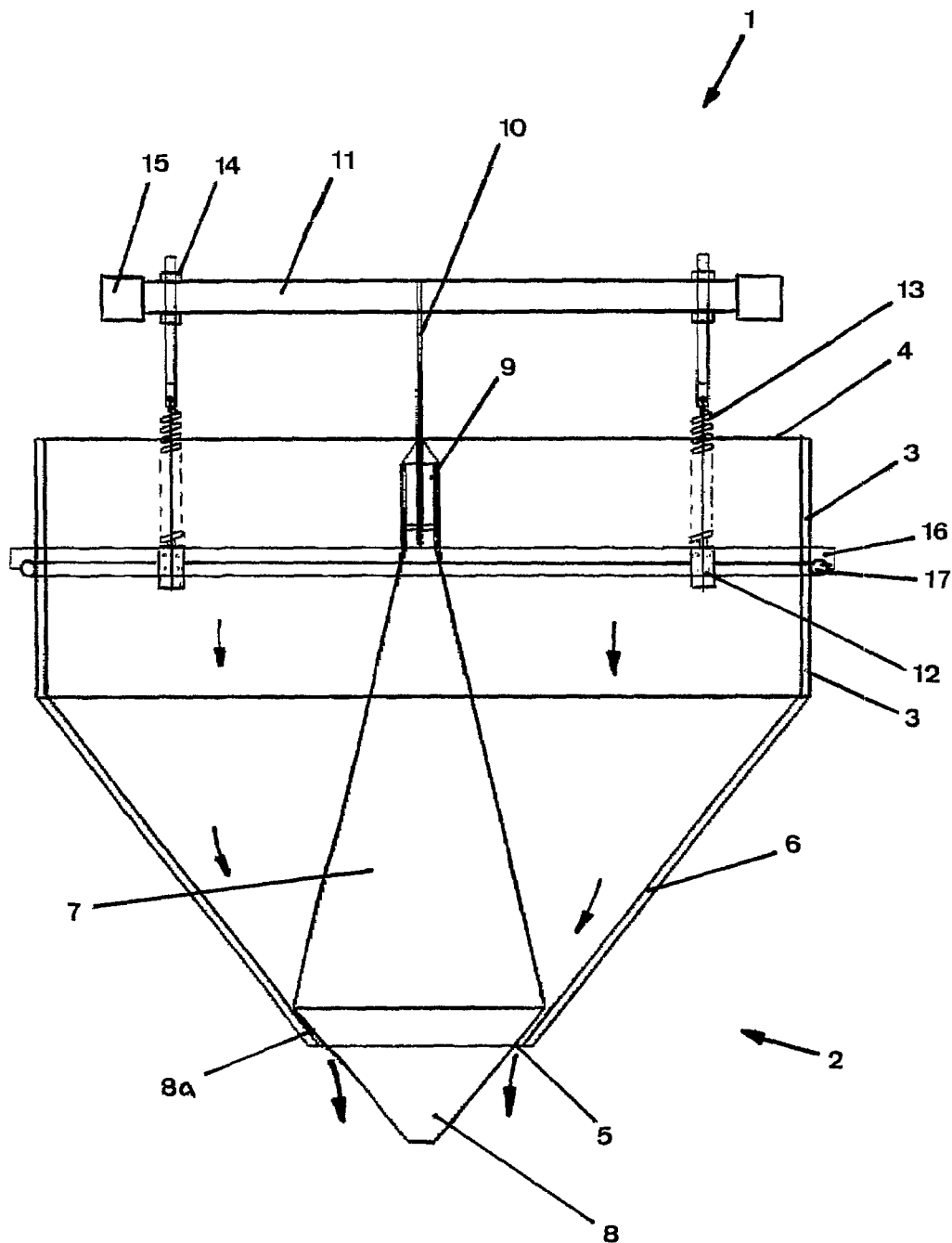
FIG. 1: Shows a side view of a discharge valve apparatus with a hopper in a substantially raised position according to a first embodiment of the invention.
Figure 2:
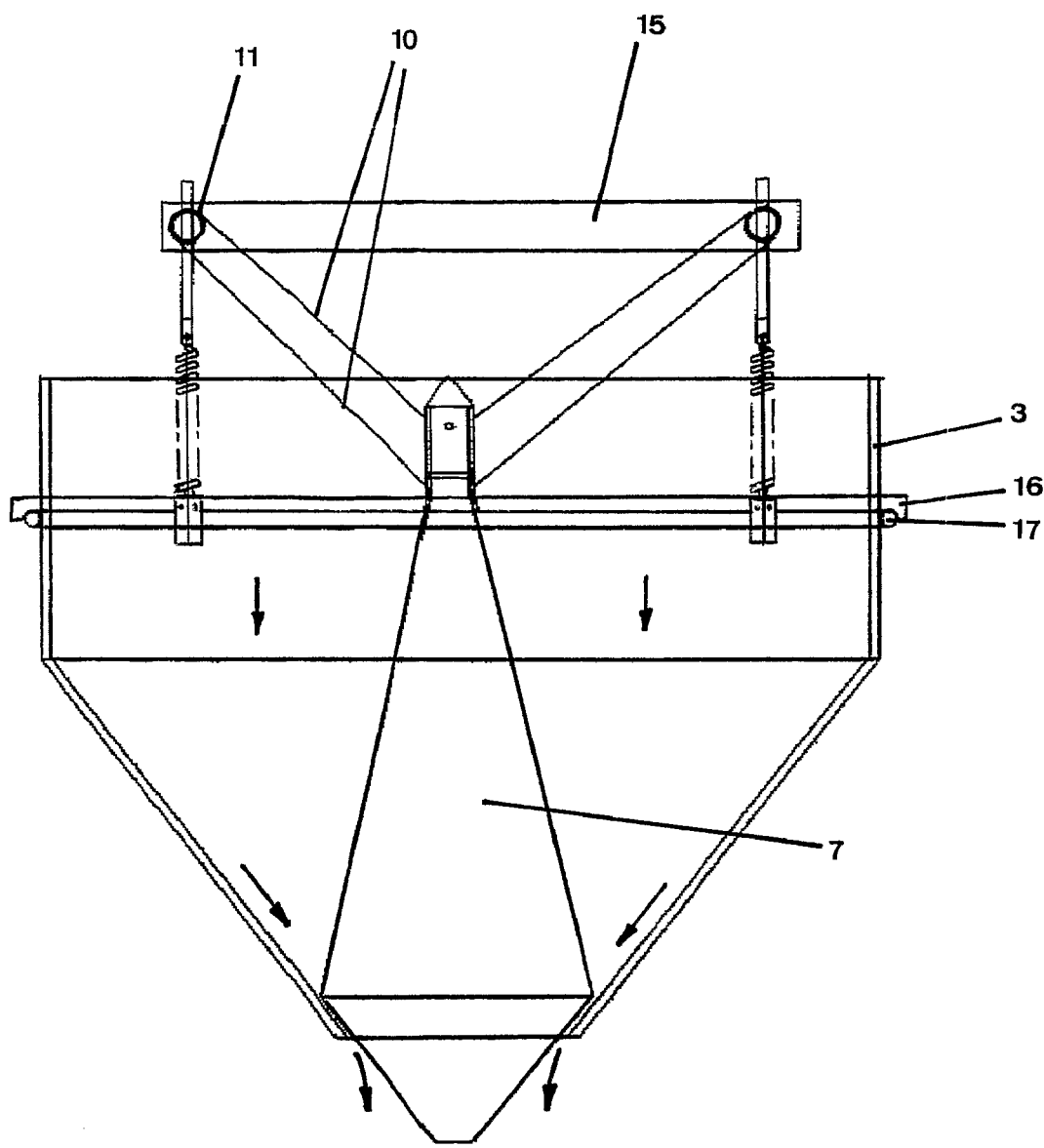
FIG. 2: Shows an end view of the discharge valve apparatus of FIG. 1.

Referring to FIGS. 1 and 2, a material discharge apparatus, generally referred to as 1, according to a first embodiment of the invention, is illustrated.

The material discharge apparatus I is generally configured and arranged in association with a conveyor system that is arranged to deliver material to a hopper 2. The conveyor system may include a conveyor belt that can move material at a steady rate and feed such material into the hopper 2. The apparatus 1 is designed for controlling the flow rate of material passing through an outlet 5 at the base of the hopper 2 and to direct the material into a pile for bulk loading into sheds, and/or for delivery into a truck trailer and/or a railway wagon.

Controlling the rate of discharge of material in a hopper 2 as in the present invention is desirable as it can result in reducing the discharge of dust into the areas about the hopper 2 during the conveying of flow material through the hopper 2.

The hopper 2 is represented in this first embodiment as having a side wall 3 that is substantially vertical in form. The side wall 3 is circular to define a mouth or inlet opening 4 into which suitable flow material is placed for conveying through the hopper 2 and discharged through a circular aperture at the base of the hopper defined as a discharge outlet 5.

Suitable flow material includes particulate or granular material (not shown) that can be gravity fed through the hopper 2. The hopper 2 preferably includes a conical portion 6 to direct material toward the outlet 5. The conical portion 6 extends from the circular side wall 3 to the lower end of the conical portion to define a circular discharge outlet 5. It will be appreciated that if the bulk solid material being conveyed is a granular material, it can be loaded or dropped into the opening 4 of the hopper 2 and is gravity fed toward the discharge outlet 5.

The material discharge apparatus 1 advantageously includes a valve means 7 configured and arranged adjacent the discharge outlet 5. The valve means 7 preferably includes an elongate plug configured and arranged in a substantially central orientation with respect to the side wall 3 and outlet 5. The lower end portion of the valve means 7 is desirably provided with a bulbous conical end portion 8. The conical end portion 8 is desirably provided with an outer surface 8a that, in position for use, is substantially parallel with the inner wall of the conical portion 6 of the hopper 2. Advantageously the middle portion of the valve means 7 is tapered towards the top end portion 9 of the valve means 7.

The top end portion 9 of the valve means 7 is associated with a valve setting and adjustment means, and in this first embodiment the top end portion 9 has a cap 9. The cap 9 is provided with attachment means for a rope or chain means 10 to be attached thereto. Preferably the rope or chain means 10 is in the form of a metal chain having no elastic properties. The chains 10 extend from the cap 9 and attach about a pipe 11 by any known and suitable attachment means such as a clamp or a shackle. The valve setting and adjustment means is for setting the desired clearance gap between the plug or valve means 7 or more particularly the outer surface 8a of the conical end portion 8 and the discharge outlet 5 of the hopper 2. It will be appreciated that the larger the gap the more material will flow through the hopper 2 during use.

This adjustable gap feature can be useful for allowing a secondary means for setting the gap between the valve means 7 and the discharge outlet 5. This gap may be predetermined before the conveying operation commences and may be about 2 to 2.5 centimeters or as required depending on the type of material being conveyed and the desired rate of flow of the material through the conveying means. It will be appreciated that different gaps will be required for different types of granular or particular material being conveyed.

In this non-limiting first embodiment of the invention the hopper 2 is adapted to be movable in a vertical plane by a support and suspension arrangement. In this arrangement, once the discharge clearance gap has been set, it is the hopper 2 that will, in use, move relative to the plug 7, the plug 7 being fixed in position. It is seen that the gap will increase or decrease depending on the weight of the material placed in the hopper 2, and the hopper 2 itself, as the material is being conveyed through the hopper 2 and discharged.

The arrangement includes four brackets 12 attached to hopper attachment members 16. The hopper attachment means 16 can be any suitable form of attachment and in this embodiment is a metal ring 16 arranged about the side wall 3 of the hopper 2. The metal ring 16 desirably snugly fits under a protruding rim 17 extending out from the side wall 3. Each bracket 12 is adapted to attach to the lower end of vertically extending hopper support members 13. The top end of each hopper support member 13 is attached to the pipes 11 by a mounting means preferably in the form of clamps 14. The clamps 14 may preferably include hopper support member adjusting means in the form of adjustable screws and wherein the top end of the support members 13 may be threaded to allow for the distance between the pipes 11 and the mouth or opening 4 of the hopper 2 to be adjusted and set, as required.

The pipes 11 are mounted at each end thereof to spaced apart beams 15. The beams 15 are fixed in a horizontal plane at a suitable height from the hopper 2 and provide a supporting frame to the apparatus 1.

Each hopper support member 13 is flexible such that it can stretch or expand under a weight of lading such that the hopper 2 lowers relative to the pipes 11 and beams 15 when material is being conveyed into the hopper 2, and rises relative to the beams 15 as material exits the outlet 5 and the weight of lading reduces. Any desirable material or component that can expand under a load or weight of lading can be used such as, for example, a coil spring. It is envisaged that different types of hopper support members 13 can be provided depending on the material being conveyed through the hopper 2.

It is seen that the material being conveyed through the hopper 2 of the apparatus 1 can squeeze air trapped in the material to allow the material to flow as a solid column from the outlet 5. A desirable result of this invention is with causing a solid column of flowable particulate material to flow from the outlet 5 of the apparatus 1 with a lower dust level than with using a standard or conventional hopper.

It will be appreciated that the hopper 2 and associated plug or valve means 7 can vary in size to accommodate different materials and the amount of material required to be conveyed through the hopper 2 into say, bulk loading into sheds, into a truck trailer or into a railway wagon.

It is envisaged that a smaller version of the apparatus 1 can convey up to 250 tonnes per hour and a larger capacity apparatus 1 can be adapted to convey up to 400 tonnes per hour. These figures are with conveying flowable material having a specific gravity of between about 0.8and 1.6%. Other applications and sizes are envisaged and the invention is not strictly limited by these examples in any way.

Figure 3:
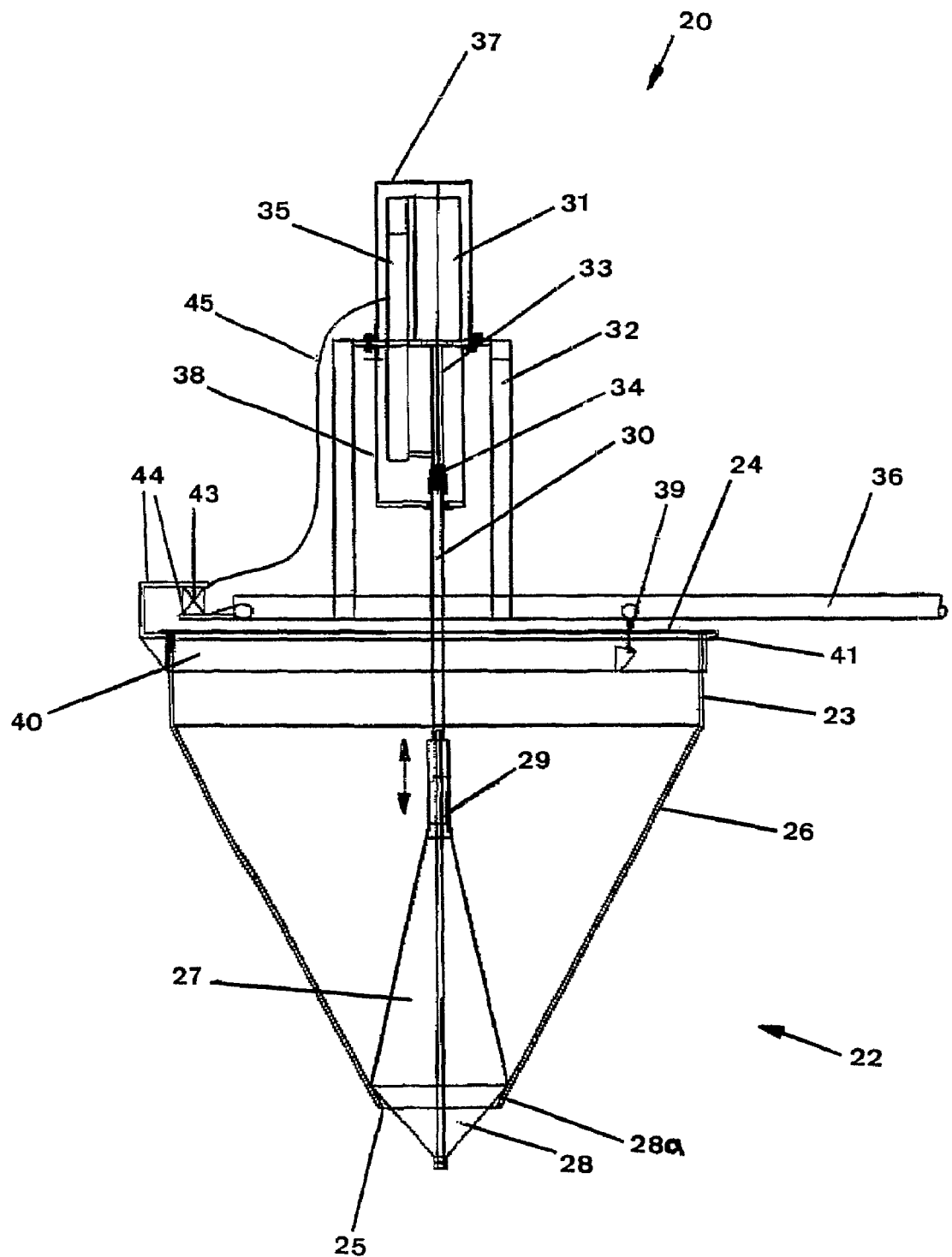
FIG. 3: Shows a side view of a computer controlled material discharge apparatus with a valve means in a substantially lowered position according to a second embodiment of the invention.
Figure 4:
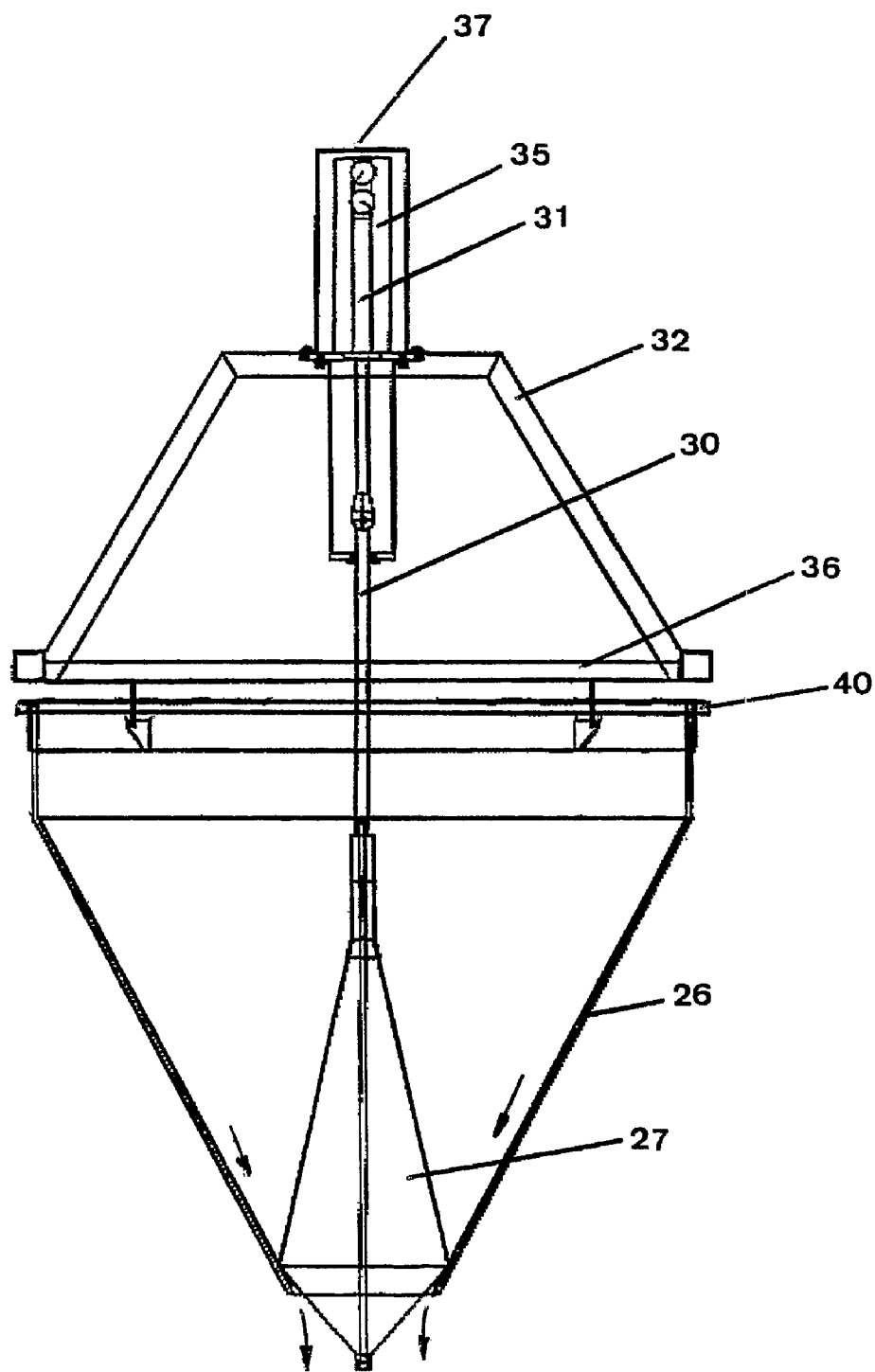
FIG. 4: Shows an end view of the material discharge apparatus of FIG. 3.

Referring now to FIGS. 3 and 4, a side view of a computer controlled material discharge apparatus, generally referred to as 20, according to a second embodiment of the invention, is illustrated.

The material discharge apparatus 20 is generally configured and arranged in association with a conveyor that delivers material to a hopper 22. The material can be fed to the apparatus 20 in a similar way as for the apparatus 1, and therefore further details will not be repeated. The apparatus 20 is considered to be a second embodiment and particularly suitable for applications whereby good control of the flow of material is required.

The hopper 22 is represented in this second embodiment as having a side wall 23 that is substantially vertical in form. The side wall 23 is circular to define a mouth or inlet opening 24 into which a flowable particulate or granular material such as fertiliser, sugar, sand and the like can be delivered for conveying through the hopper 22 and discharged through an aperture at the base of the hopper defined as a discharge outlet 25.

The hopper 22 preferably includes a conical portion 26 to direct material toward the discharge outlet 25. The conical portion 26 extends from the side wall 23, illustrated in this embodiment as circular in cross section, in a tapered form toward the lower end of the conical portion to define a circular discharge outlet 25. It will be appreciated that in operation, flowable material can be conveyed or delivered into the opening 24 of the hopper 22 which is then gravity fed toward the discharge outlet 25.

The material discharge apparatus 1 advantageously includes a valve means 27 configured and arranged adjacent the discharge outlet 25. The valve means 27 preferably includes an elongate plug configured and arranged in a substantially central orientation with respect to the side wall 23 and outlet 25. The lower end portion of the valve means 27 is desirably provided with a bulbous conical end portion 28. The conical end portion 28 is desirably provided with an outer surface 28a that, in position for use, is substantially parallel with the inner wall of the conical portion 26 of the hopper 22. Advantageously the middle portion of the valve means 27 is tapered towards the top end portion 29 of the valve means 27. This can provide a plug having a lower centre of gravity, although the bulbous end portion 28 is shaped to allow for a suitable clearance gap between the hopper 22 and the outer surface 28a for purposes of controlling the flow of material and hence the discharge rate of material passing through the hopper 22.

The top end portion of the valve means 27 is preferably adapted to be attached to a cap 29. An extension shaft 30 is configured to attach to the cap 29 and may optionally be attached substantially through the plug or valve means 27. The shaft 30 is made of any suitable durable and resilient material, and in this embodiment is made of stainless steel. The shaft should comprise a suitably robust material, and be of a suitable size to withstand the forces applied by material passing through the hopper 22 and past the valve means 27. In this embodiment the shaft 30 is about 2 centimeters in diameter although may be of a different size if required.

The top end of the shaft 30 is adapted to be associated with a valve height adjustment means for reciprocating motion or movement of the shaft and hence the valve means 27. The valve height adjustment means can include any known devices capable of raising and lowering the valve means, such as, for example, a bi-directional motor and pulley system as commonly integrated in cranes, a rack and pinion mechanism involving a bi-directional DC motor, or an hydraulic or pneumatic/air ram adapted to be attached to the substantially vertically disposed shaft 30. It will be appreciated that the valve height adjustment means preferably includes the means to allow fall control over the raising and lowering of the valve means 27 to increase the steady changes to the discharge rate of the flow material.

In this non-limiting embodiment an air ram 31 is adapted and configured to be mounted to a top frame 32. The top frame is itself supported by the main frame 36. The main frame 36 is fixed or suspended in position and supports the apparatus 1. The reciprocating air ram plunger or shaft 33 is connected to the extension shaft 30 by any suitable attachment means 34 such as a clamp, with the ram 31 being suitably powered by a power supply. The air ram 31 is desirably encased in a housing 37 with the top end portion of the shaft 30 and the air ram shaft 33 being encased in a suitable cover 38 that is adapted to allow for the reciprocating movement of the shafts 30, 33.

The hopper 22 is adapted to be attached to the main frame 36 by any suitable means, and in this embodiment a plurality of brackets 39 about the outer side wall 23 of the hopper 22 is provided. The brackets 39 can be attached directly to the hopper 22 should the hopper 22 be made of a suitable material such as a solid metal, or the brackets 39 can be attached to a metal rim 40 fitted about the outer side wall 23 with the rim 40 locating under a protruding rim 41 extending outwardly from the hopper 22.

The air ram 31 is preferably adapted to be operable and controllable by a valve control means 35 that is located adjacent the air ram 31 or located remotely. The valve control means 35 is preferably a computer controller means suitably programmed by a computer program for controlling the lifting and lowering adjustments required of the air ram 3 1. It is seen that the lifting and lowering adjustments, that may be operated in predetermined incremental steps from an initial set up position, will increase and decrease the clearance gap between the hopper 22 and the valve means 27 between which material flows therebetween and through the discharge outlet 25.

The initial clearance gap set may be any suitable clearance generally dependent on the type of material being conveyed, and in many applications the initial clearance gap may be between 2 and 2.5 centimeters.

The computer controller means 35 is suitably programmed to receive feedback signals representing a measurement of weight of the hopper 22. These feedback signals are required to calculate whether the flow rate through the hopper 22 should be increased or decreased. This measurement signal can preferably be obtained from a load cell 43 adapted to be associated with the hopper 22 and preferably mounted to the support frame 36 by way of a suitable load cell mounting means 44. It will be appreciated that the load cell 43 operates as a weight or force transducer that can obtain measurements of weight and preferably be adapted to convert an analogue signal into a suitable digital signal that is fed to the computer controller means 35.

The load cell 43 can include a form of strain gauge and may include any suitable number of load cells about the hopper 22 although in this second embodiment one load cell 43 is applied, with a number of hopper brackets 39 located opposite the load cell 43.

In the case of several load cells 43 being applied a suitable means to sum the measured signals for feeding to the controller means 35 can be integrated with the feedback signals to the controller means 35 via any wireless or wired communication means and in this embodiment a cable 45 is used.

In operation, and in accordance with a method of carrying out the invention, an operator will preset a desired weight figure into the computer program running the controller means 35. The plug or valve means 27 can be left in a default lowered position with preferably no clearance with the gap between the valve means 27 and the inner wall of the hopper 22. Flowable material is conveyed into the hopper 22 and the load cell 43 periodically obtains measurements of weight and feeds such signals to the controller means 35. The frequency of the feedback signals can be preset also. When the controller means 35 determines that the measured weight signals reach the preset weight figure, the controller means 35 activates the valve height adjustment means in the form of an air ram 31 to lift the valve means 27 and thus opening a gap between the valve means 27 and the hopper 22 to allow flowable material to be discharged through the discharge outlet 25. If the weight signals being fed back to the controller means 35 continue to increase the flow rate can be further increased by lifting the valve means 27 even further to increase the gap. This step is taken until the controller means 35 determines that the weight of the hopper 27 is not increasing, at which time the controller means 35 can cease any further increases in the gap. At this point it will be appreciated that the flow rate of material being delivered into the hopper 22 is substantially machine the rate of discharge of material through the hopper 22 and this is desirable.

The lowering of the valve means 27 may be initiated if the load cell weight measurement signals indicate that the weight being periodically measured in the hopper 22 is decreasing. In this instance, the controller means 35 may initiate a control signal to the air ram 31 to lower the valve means 27 to decrease the gap and hence slow the rate of discharge of the material through the hopper 22. This will increase the amount of material in the hopper 22 and the load cell 43 until the weight is substantially matched to the preset weight figure set at the start of the process.

The valve means and the hopper of the invention may be made of any suitable and durable material such as, for example, a plastics material, metal, or any combinations thereof. The hopper may more preferably be constructed of a rotary moulded plastics material.

Figure 5:
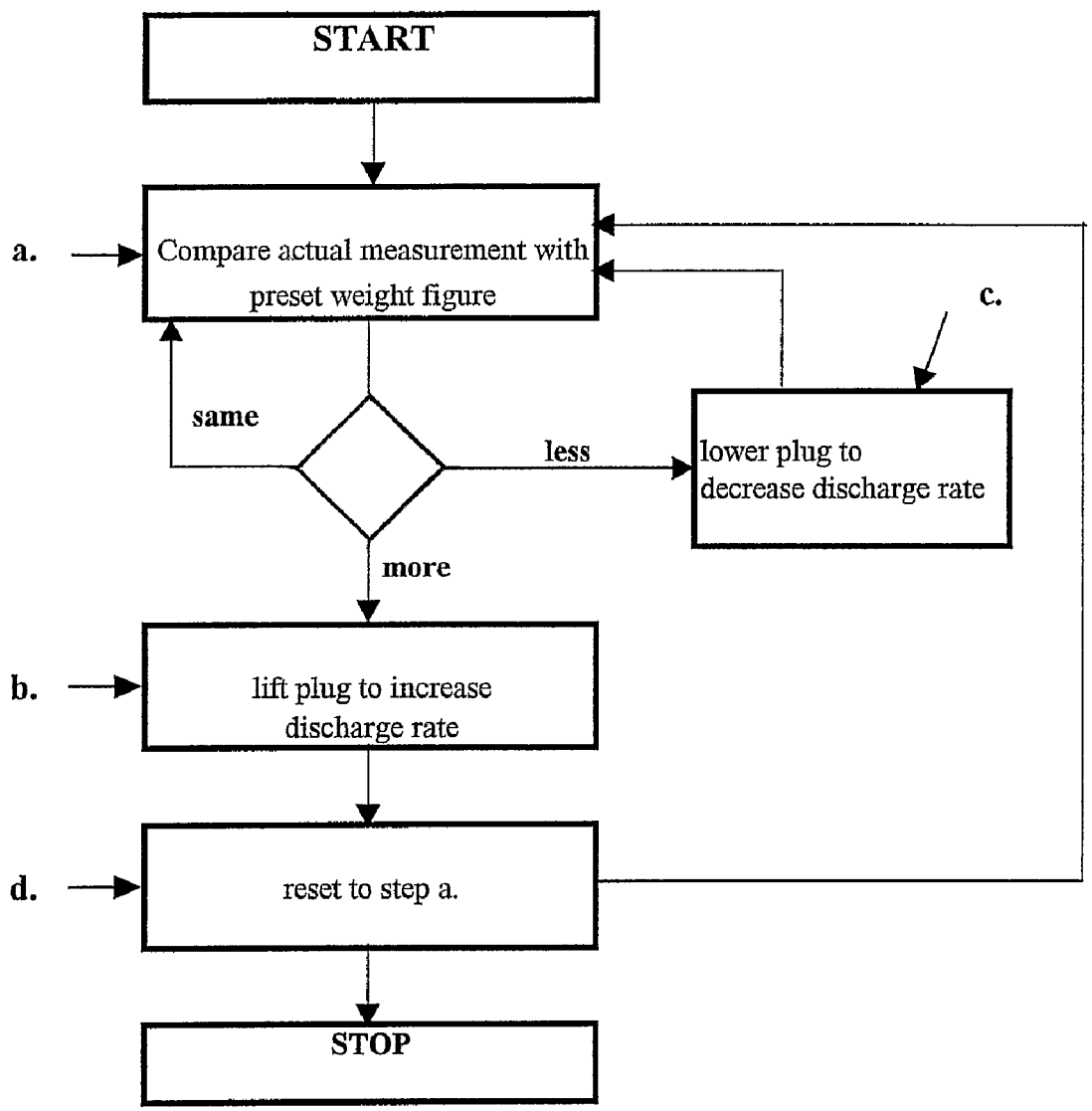
FIG. 5: Shows a flow chart representing a computer controlled process for controlling the flow rate of material through a hopper.

Referring now to FIG. 5, a flow chart of broad processing steps of a computer program, generally referred to as 50, representing a computer controlled process for controlling the flow rate of material conveyed through a hopper, is illustrated.

The computer controlled process can be applied with the apparatus 20 and is preferably in the form of a computer program for running the valve control means 35. The computer controlled process includes the steps a. of receiving a measurement signal from the load cell transducer means representing an actual measurement of weight of a hopper with material flowing therethrough and comparing the measurement against a preset measurement of weight representing a preferred flow rate through the hopper. The program then calculates and determines if the actual measurement of weight is more than the preset measurement of weight, and if so, a control signal is sent to a valve height adjustment means to lift a valve means in the hopper to increase the discharge rate of material flowing through the hopper; or in accordance with step c. if the actual measurement of weight is determined by the program to be less than the preset measurement of weight a control signal is sent to the valve height adjustment means to lower the valve means in the hopper to decrease the discharge rate of material flowing through the hopper; and then in accordance with step d. the process is repeated by resetting the program to step a. with the next actual measurement signal of weight from the load cell transducer means being compared with the preset weight figure and an adjustment made if required until the material has been discharged through the hopper.

It is considered that in step a. if the program 50 determines that the actual measurement of weight is determined by the program to be the same as the preset measurement of weight the program will reset to step a.

It will be appreciated that the computer program 50 can include a preliminary step of allowing an operator to set user preferences, including the amount of times a minute the load cell transducer means will take a measurement of weight and convert such analogue signal to a digital signal that is compared and processed by the computer program 50.

It is considered that the computer program represents the broad processing steps of a program for controlling the discharge rate through the hopper of the invention, and such broad steps also disclose the broad method steps of the invention.

Wherein the afore going reference has been made to integers or components having known equivalents, then such equivalents are herein incorporated as if individually set forth. Accordingly, it will be appreciated that changes may be made to the above described embodiments of the invention without departing from the principles taught herein.

It is to be understood that the above description is intended to be illustrative, and not restrictive. Additional advantages of the present invention will become apparent for those skilled in the art after considering the principles in particular form as discussed and illustrated. Thus, it will be understood that the invention is not limited to the particular embodiments described or illustrated, but is intended to cover all alterations or modifications which are within the scope of the appended claims.

The invention claimed is:

1. A material discharge apparatus for controlling the discharge of flowable material being conveyed through a conical shaped hopper until in feeding of material is stopped or ends, the hopper being configured and arranged, in use, to be operable at a height above a discharge pile, the apparatus including the hopper having an inlet opening at the top of the hopper and an open discharge outlet at the base of the hopper, the hopper being adapted to be suspended below a fixed support frame by hopper support members, the area directly below and about the open discharge outlet being open to the surrounding environment, the discharge outlet being exposed to the surrounding environment such that, in use, flowable material is discharged through the open discharge outlet, and a valve means being configured and arranged in the hopper, the valve means including a bulb having a lower end portion positionable adjacent the discharge outlet forming a gap between the inner wall of the hopper and the bulb for material, in use, to flow by being gravity fed therebetween and out through the open discharge outlet, the bulb being adapted to be suspended below the fixed support frame, the hopper being adapted to move relative to the valve means, in use, for allowing a continual discharge of material through the gap and out through the open discharge outlet to form a column of flowing discharge material to reduce the amount of dust being dispersed into the surrounding environment.

2. A material discharge apparatus according to claim 1 wherein the valve means is arranged in the hopper such that the lower end portion adjacent the discharge outlet is substantially centrally positioned such that the gap between the hopper and the valve means is evenly spaced about the lower end portion of the valve means, and wherein the discharge outlet is not closed by the valve means.

3. A material discharge apparatus according to claim 1 wherein the hopper is adapted to be suspended below a support frame by a plurality of spaced apart hopper support members, the hopper support members being elastic in form, in use, to expand under the weight of material being conveyed through the hopper so as to increase the gap between the hopper and the valve means to increase the flow of material therethrough.

4. A material discharge apparatus according to claim 1 wherein the valve means includes a bulb having a lower end portion having a circular cross section, and wherein the hopper has a circular cross section that is tapered toward the discharge outlet.

5. A material discharge apparatus according to claim 1 wherein the hopper is made of a rotary moulded plastics material.

6. A material discharge apparatus according to claim 1 wherein the hopper support members include coil springs, in use, that are expandable under the weight of lading in the hopper.

7. A material discharge apparatus according to claim 1 wherein the bulb includes a conical lower end portion, and a conical top portion with a circular cross section being tapered toward the top end portion forming an inverted cone on the lower end portion, the conical lower end portion being tapered toward the lower end of the bulb.

* * * * *